United States Patent [19]
Miller et al.

[11] Patent Number: 5,862,368
[45] Date of Patent: Jan. 19, 1999

[54] PROCESS TO ALLOW AUTOMATIC MICROPROCESSOR CLOCK FREQUENCY DETECTION AND SELECTION

[75] Inventors: Kevin L. Miller; Stuart W. Hayes, both of Austin, Tex.

[73] Assignee: Dell USA, L.P., Round Rock, Tex.

[21] Appl. No.: 764,660

[22] Filed: Dec. 11, 1996

[51] Int. Cl.⁶ ........................................................ G06F 1/04
[52] U.S. Cl. ............................................ 395/553; 395/556
[58] Field of Search ...................................... 395/553, 555, 395/556, 182.1, 200.78

[56] References Cited

U.S. PATENT DOCUMENTS

| | | | |
|---|---|---|---|
| 5,077,686 | 12/1991 | Rubinstein | 395/550 |
| 5,378,935 | 1/1995 | Korhonen et al. | 327/114 |
| 5,428,754 | 6/1995 | Baldwin | 395/375 |
| 5,479,645 | 12/1995 | Sakai et al. | 395/550 |

*Primary Examiner*—Thomas M. Heckler
*Attorney, Agent, or Firm*—Skjerven, Morrill, MacPherson, Franklin & Friel LLP; M. Kathryn Tsirigotis

[57] ABSTRACT

The present invention provides a computer system which electronically and automatically detects the maximum rated operating frequency of a microprocessor installed in the computer system. The present invention also electronically and automatically detects, selects and generates a "common" external/internal operating clock frequency in a multiprocessor system when more than one microprocessor is installed in the computer system. More particularly, a computer system is disclosed which includes at least one microprocessor and a main memory coupled to each microprocessor. Each microprocessor includes an electronic stamp with a value of a maximum rated operating frequency for the microprocessor written therein. The computer system includes a clock generating section for electronically detecting the value of the maximum rated operating frequency of the each microprocessor and for selecting and generating an operating frequency for the computer system. In one embodiment of the present invention, the electronic stamp on each microprocessor includes a nonvolatile memory module, such as an electrically erasable reprogrammable nonvolatile memory, coupled to each microprocessor with the value of the maximum rated operating frequency of the microprocessor stored in, for example, a register. In another embodiment of the present invention, the electronic stamp on each microprocessor includes an encoded strapping circuit integrated into each microprocessor which provides the value of the maximum rated operating frequency in an electronically coded form, such as pins on the microprocessor with a coded setup.

19 Claims, 3 Drawing Sheets

PROCESS TO ALLOW AUTOMATIC MICROPROCESSOR CLOCK FREQUENCY DETECTION AND SELECTION

BACKGROUND OF THE INVENTION

1. Field of the Invention

This invention relates to clock frequencies in a computer system and more particularly to microprocessor frequency detection and selection.

2. Description of the Related Art

Modern day computer systems, particularly personal computer systems, include a system unit having a system processor or microprocessor with associated volatile and non-volatile memory, a display monitor, a keyboard, one or more floppy diskette drives, a hard disk storage device and an optional printer. One of the distinguishing characteristics of these systems is the use of a system board or motherboard to electrically connect these components together. A personal computer system may also include one or a plurality of I/O devices (i.e. peripheral devices) which are coupled to the system processor and which perform specialized functions.

Computer systems operate under the control of one or more "clocks" or signal lines carrying a signal of a predetermined frequency and duty cycle. The clock signal is provided to various components in the computer system and these components typically carry out some operation or set of operations during one or more "clock cycles" or cycles of the signal. The coordination of all the processes between a microprocessor and main memory is carried out using the clock signal from the clock generator. Without this signal, complete chaos would arise, and correct data transfer would be impossible. However, the clock signals lead to correct execution, and give the individual circuits enough time to fulfill their tasks.

Of course, the various components of the computer system must be designed to match the clock speed or frequency. The computer system must be designed to provide a clock signal of the appropriate clock speed to circuits used in the computer system. This creates a special problem in multiple microprocessor computer systems where it is desired to operate all components under the control of a single clock and, for example, only one of the processor modules is upgraded with a higher speed microprocessor. Synchronization between microprocessors is a continuing critical issue in a very wide variety of multiprocessor systems.

Current methods of producing microprocessors includes fabricating and assembling the microprocessor and then testing for its maximum allowable operating clock speed. After testing the microprocessor, it is visibly labeled with a part number and rated clock frequency and then shipped to the end users or customers. The microprocessors are labeled manually and there is no automatic or electronic process for a computer system to know what the maximum rated clock frequency is for that installed microprocessor. Jumpers must be manually set within the computer system when installing the microprocessor. Also, in multiprocessor environments where microprocessors of the same family could be installed in the same system bus, each with different maximum rated frequencies, a problem of synchronization of the multiple microprocessors to the same clock frequency (i.e. usually the lowest common frequency) may occur. Therefore, a system is needed to automatically detect and select the common operating external/internal clock frequencies in a multiprocessor system when the microprocessors are installed.

SUMMARY OF THE INVENTION

The present invention provides a computer system which electronically and automatically detects the maximum rated operating frequency of a microprocessor installed in the computer system. The present invention also electronically and automatically detects, selects and generates a "common" operating clock frequency in a multiprocessor system when more than one microprocessor is installed in the computer system.

More particularly, a computer system is disclosed which includes at least one microprocessor and a main memory coupled to each microprocessor. Each microprocessor includes an electronic stamp with a value of a maximum rated operating frequency for the microprocessor written therein. The computer system includes a clock generating section for electronically detecting the value of the maximum rated operating frequency of the each microprocessor and for selecting and generating an operating frequency for the computer system. The operating frequency is equal to the maximum rated operating frequency of the microprocessor when the computer system has one microprocessor, however, when the computer system has more than one microprocessor, the operating frequency is equal to the slowest maximum rated operating frequency of the microprocessors.

In one embodiment of the present invention, the electronic stamp on each microprocessor includes a nonvolatile memory module, such as an electrically erasable reprogrammable nonvolatile memory, coupled to each microprocessor with the value of the maximum rated operating frequency of the microprocessor stored in a register. In another embodiment of the present invention, the electronic stamp on each microprocessor includes an encoded strapping circuit integrated into each microprocessor which provides the value of the maximum rated operating frequency in an electronically coded form, such as pins on the microprocessor with a coded setup.

A computer system is thus provided which facilitates ease of use and increases reliability by electronically and automatically detecting and selecting the maximum rated operating frequency of one or more microprocessors used in a computer system and generating a "common" external/internal operating clock frequency for the system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
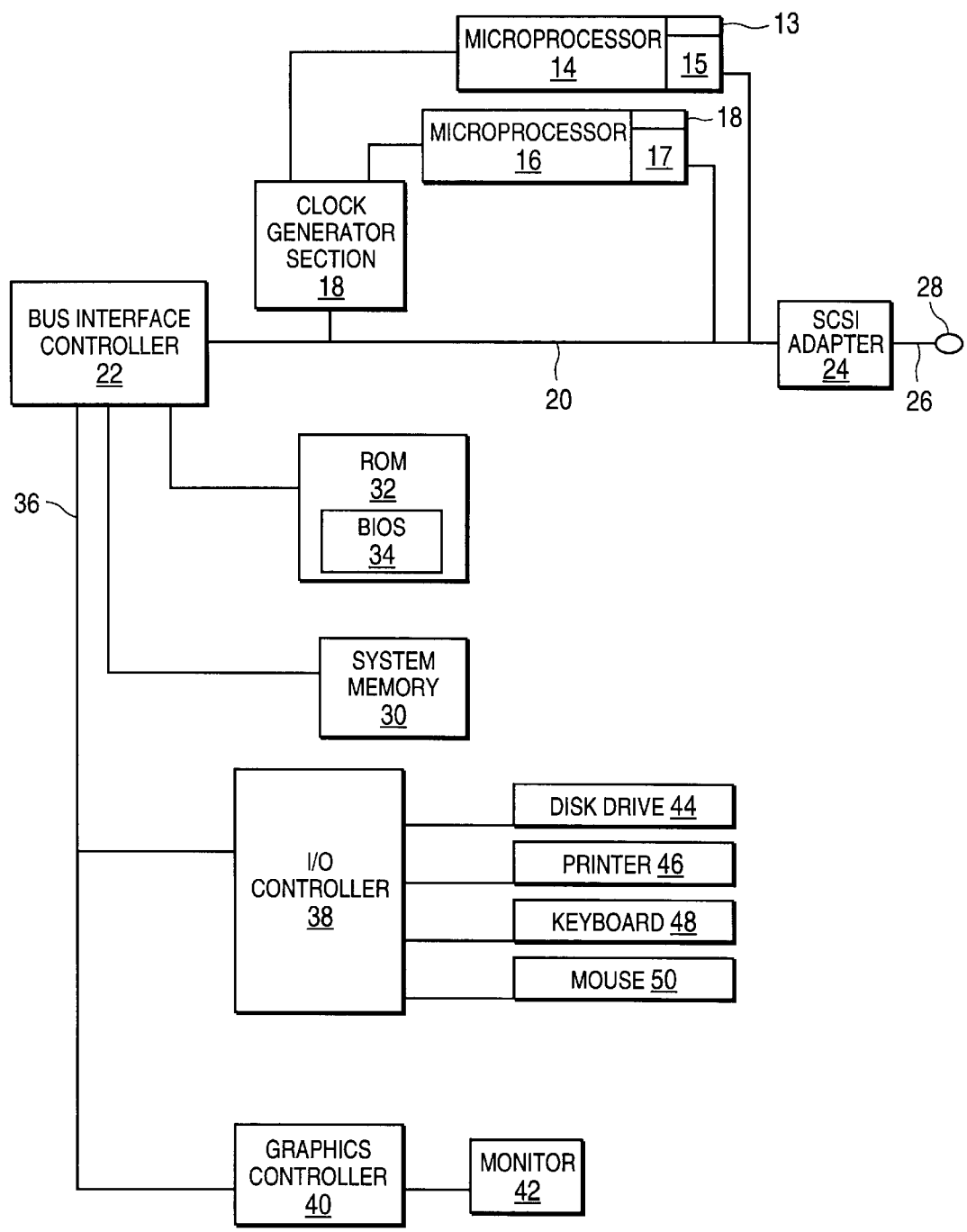
FIG. 1 shows a block diagram of a multiprocessor system including a clock generating section and microprocessors in accordance with a first embodiment of the present invention.

Referring to FIG. 1, an example of a multiprocessor computer system 12 in accordance with a preferred embodiment of the present invention is shown including a first microprocessor 14 and a second microprocessor 16, each having an electronic stamp with a value of a maximum rated operating frequency written therein, and coupled to a clock generating section 18 which, in turn, is coupled to local bus 20. The first microprocessor 14 and the second microprocessor 16 are also coupled to local bus 20 which, in turn, is coupled to bus interface controller 22, and small computer system interface (SCSI) adapter 24. The first and second microprocessors 14 and 16, respectively, are preferably microprocessors from the family of x86 microprocessors, such as the 486 or Pentium™ microprocessor.

The electronic stamp on each of the first and second microprocessors 14 and 16, respectively, includes a first nonvolatile memory module 15 coupled to the first microprocessor 14 and second nonvolatile memory module 17 coupled to the second microprocessor 16. The first and second nonvolatile memory module, 15 and 17, respectively, include, for example, an electrically erasable reprogrammable nonvolatile memory, with the value of the maximum rated operating frequency for the first microprocessor 14 stored in a register 13 of the first nonvolatile memory module 15, and the value of the maximum rated operating frequency for the second microprocessor 16 stored in a register 18 of the second nonvolatile memory module 17. The clock generating section 18 (further illustrated and discussed in FIG. 2) electronically detects the value of the maximum rated operating frequency for each of the first and second microprocessors 14 and 16, respectively, and then selects and generates an operating frequency for the computer system 12.

When the computer system 12 has more than one microprocessor (such as the multiprocessor system illustrated in FIG. 1), the operating frequency is equal to the slowest maximum rated operating frequency of the microprocessors. In the computer system 12, the operating frequency selected by the clock generating section 18 is equal to the slowest maximum rated operating frequency of the first and second microprocessors 14 and 16, respectively. The clock generating section 18 assigns the selected operating clock frequency to both the first and second microprocessor 14 and 16, respectively, for synchronization of the microprocessors and generates the operating frequency to the computer system 12 such as for bus speeds and interface logic frequencies. Although not illustrated, the present invention may be used with a computer system having only a single microprocessor. When the computer system has only one microprocessor, the operating frequency is equal to the maximum rated operating frequency of that microprocessor. The clock generating section electronically detects the value of the maximum rated operating frequency stamped onto the microprocessor and selects and generates that maximum rated operating frequency as the operating frequency for the computer system.

Referring back to FIG. 1, local bus 20 includes conventional data, address and control lines conforming to the architecture of the family of microprocessors. SCSI adapter 24 couples local bus 20 to SCSI bus 26 which is coupled to connection terminal 28 via which SCSI devices such as a SCSI hard drive may be coupled to SCSI adapter 24.

Bus interface controller 22 performs two primary functions. The first function that bus interface controller 22 performs is as a memory controller for accessing main system memory 30 and nonvolatile memory 32. Main system memory 30 is a dynamic random access memory (RAM) which includes one or more single, in-line memory modules (SIMMS) and stores programs and data for execution by the first and second microprocessors 14 and 16, respectively. Nonvolatile memory 32 is, e.g., a read only memory (ROM) which stores microcode including basic input output system (BIOS) 34 of computer system 12.

BIOS 34 is a microcode software interface between an operating system or application programs and the hardware of system 12. The operating system and application programs access BIOS 34 rather than directly manipulating I/O ports and control words of the specific hardware. BIOS 34 is accessed through an interface of software interrupts and contains a plurality of entry points corresponding to the different interrupts. In operation, BIOS 34 is loaded from ROM 32 to system memory 30 and is executed from system memory 30.

The second function that bus interface controller 22 performs is as an interface between bus 20 and input/output (I/O) bus 36. I/O bus 36 conforms to the industry standard architecture (ISA) standard, which is also sometimes referred to as the AT bus standard. Bus 36 is further coupled to I/O controller 38, graphics controller 40. I/O controller 38 is coupled to and controls the operation of disk drive 44, printer 46, keyboard 48, and mouse 50. Graphics controller 40 is further coupled to monitor 42, which is a conventional computer display device conforming to, e.g., the super video graphics array (SVGA) standard. Alternatively, graphics controller 40 may be coupled to local bus 20.

Figure 2:
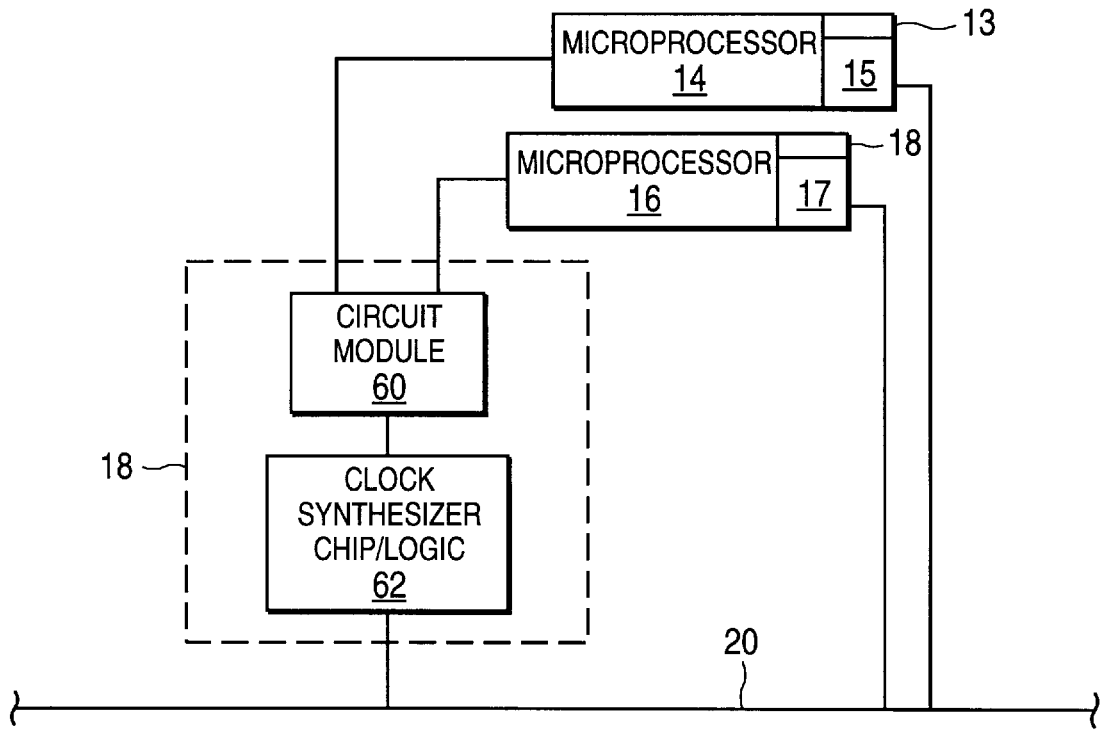
FIG. 2 shows a block diagram of the FIG. 1 clock generating section and microprocessors.

Referring to FIG. 2, the clock generating section 18 includes a programmable frequency generator integrated circuit having a circuit module 60 and a clock synthesizer chip and associated logic 62. The circuit module 60 detects the value of the maximum rated operating frequency for each of the first and second microprocessors 14 and 16, respectively, by reading the value from the registers 13 and 18, respectively, of the first and second nonvolatile memory modules 15 and 17, respectively. The circuit module 60 then selects the operating frequency for the computer system 12 by selecting the slowest maximum rated operating frequency of the first and second microprocessors 14 and 16, respectively. The clock synthesizer chip and associated logic 62 assigns the operating frequency to the first and second microprocessors 14 and 16, respectively, and generates the operating frequency for the computer system 12.

Figure 3:
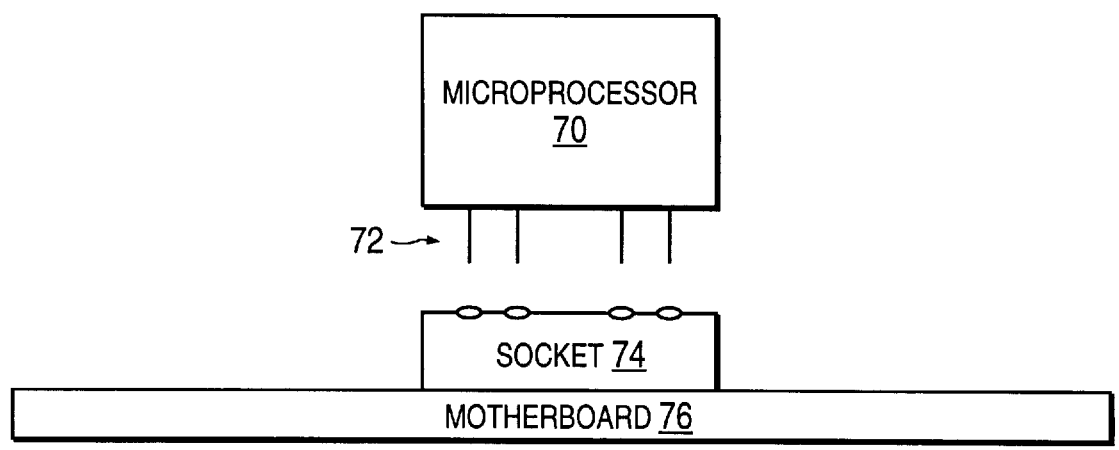
FIG. 3 shows a simplified plan view of a microprocessor and a motherboard of a computer system in accordance with a second embodiment of the present invention.

FIG. 3 illustrates a simplified plan view of a single microprocessor 70 in accordance with a second embodiment of the present invention. In this second embodiment, the electronic stamp on the microprocessor 70, which has the value of the maximum rated operating frequency for the microprocessor 70 written therein, includes an encoded strapping circuit, such as pins 72 with a coded setup, integrated into each said microprocessor which provides the value of the maximum rated operating frequency in an electronically coded form. The coded setup may be any type of coded form such as a binary code sequence of 0s and 1s, for example. The microprocessor 70 is installed into a motherboard 76 of a computer system through the use of a microprocessor socket 74. Main memory (not shown) is included on the motherboard 76 and coupled to the microprocessor 70.

A clock generating section (not shown in this figure) including a programmable frequency generator integrated circuit having a circuit module and a clock synthesizer chip and associated logic as described and illustrated in FIG. 2 is coupled to the motherboard 76. The circuit module of the clock generating section electronically detects the value of the maximum rated operating frequency for the microprocessor 70 by interpreting the coded setup of the pins 72 to read the value of the maximum rated operating frequency and then selecting the operating frequency for the computer system. As discussed previously, the operating frequency is equal to the maximum rated operating frequency of the microprocessor 70 for a computer system having a single microprocessor 70. The clock synthesizer chip and associated logic of the clock generating section generates the operating frequency for the computer system.

Figure 4:
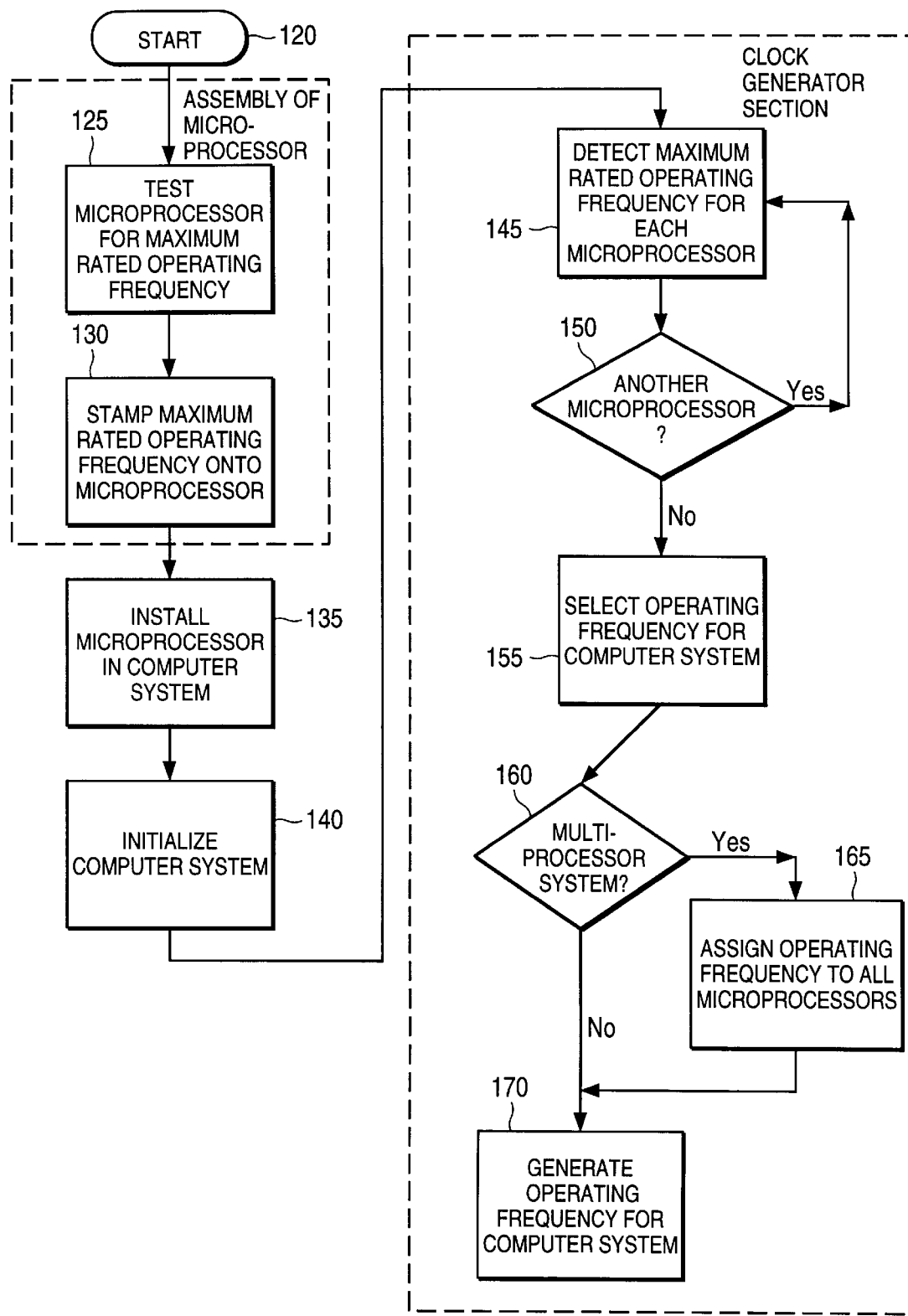
FIG. 4 is a flow chart illustrating the method of the present invention.

FIG. 4 is a flowchart illustrating the method of the present invention used in a computer system having at least one microprocessor and a main memory coupled to the microprocessor for electronically detecting a maximum rated operating frequency for the microprocessor and selecting an operating frequency for the computer system, wherein process flow starts at start block 120. In the assembly of the microprocessor, as per block 125, each microprocessor to be used in the computer system is tested before installation for the maximum rated operating frequency for that microprocessor. The value of the maximum rated operating frequency is then electronically stamped onto the microprocessor as per block 130.

The electronic stamping comprises, for example, programming the value of the maximum rated operating frequency onto a nonvolatile memory module integrated into each microprocessor. The nonvolatile memory module is, for example, an electrically erasable reprogrammable nonvolatile memory and the programming step includes writing the value of the maximum rated operating frequency onto a register of the electrically erasable reprogrammable nonvolatile memory. Alternatively, the electronic stamping comprises integrating an encoded strapping circuit into the microprocessor which provides the value of the maximum rated operating frequency in an electronically coded form on each microprocessor.

The one or more microprocessors are installed in the computer system as per block 135, for instance, by a purchaser of the microprocessor, and the computer system is initialized per block 140. The clock generating section, coupled to the computer system and described previously, detects the value of the maximum rated operating frequency for each microprocessor as per block 145. The clock generating section includes a programmable frequency generator integrated circuit programmed to read the value of the maximum rated operating frequency from the register of the electrically erasable reprogrammable nonvolatile memory integrated into the microprocessor, or, alternatively, to interpret the encoded strapping circuit and read the value of the maximum rated operating frequency for each microprocessor.

The clock generating section then conducts a test at decision block 150 to find out if the computer system has a single microprocessor or is a multiprocessor system. For example, if the computer system has a single microprocessor, then the maximum rated operating frequency of than microprocessor is selected as the operating frequency for the computer system as per block 155. However, if the computer system is a multiprocessor system, then the selection step of block 155 selects the slowest maximum rated operating frequency value of all the microprocessors as the operating frequency for the computer system. After an operating frequency has been selected, another query at decision block 160 ask whether the computer system is a multiprocessor system. If the answer is YES, then the clock generator section assigns the operating frequency to all the microprocessors for synchronization of the microprocessors. If the answer is NO, or after assigning the operating frequency, the clock generator section generates the selected operating frequency for the computer system.

The foregoing has described a computer system, microprocessor and methodology which provides an automatic capability for a computer system to electronically detect the maximum rated operating frequency of one or more microprocessors used in the computer system. The present invention also provides for automatic and electronic selection of an operating frequency for a multiprocessor computer system. This system and methodology has the advantage of improving reliability of operating frequency detection and selection.

Other embodiments are within the following claims and while only certain preferred features of the invention have been shown by way of illustration, many modifications and changes will occur. For example, while the preferred embodiment is set forth as hardware in an application specific integrated circuit, it is anticipated that the invention could be implemented in software also. It is, therefore, to be understood that the present claims are intended to cover all such modifications and changes which fall within the true spirit of the invention.

What is claimed is:

1. A computer system comprising:

at least one microprocessor;

a main memory coupled to each said microprocessor;

an electronic stamp on each said microprocessor with a value of a maximum rated operating frequency for said microprocessor written therein; and a clock generating section for electronically detecting said value of said maximum rated operating frequency for each said microprocessor and for selecting and generating an operating frequency for said computer system.

2. The computer system of claim 1 wherein, when said computer system has one microprocessor, said operating frequency is equal to the maximum rated operating frequency of said microprocessor.

3. The computer system of claim 1 wherein, when said computer system has more than one microprocessor, said operating frequency is equal to the slowest maximum rated operating frequency of said microprocessors and wherein said clock generating section assigns said operating clock frequency to all microprocessors for synchronization of said microprocessors.

4. The computer system of claim 1 wherein said electronic stamp on each said microprocessor includes a nonvolatile memory module coupled to each said microprocessor with said value of said maximum rated operating frequency stored therein.

5. The computer system of claim 4 wherein said nonvolatile memory module is an electrically erasable reprogrammable nonvolatile memory and said value of said maximum rated operating frequency of said microprocessor is stored in a register of said electrically erasable reprogrammable nonvolatile memory.

6. The computer system of claim 1 wherein said electronic stamp on each said microprocessor includes an encoded strapping circuit integrated into each said microprocessor which provides said value of said maximum rated operating frequency in an electronically coded form.

7. The computer system of claim 6 wherein said electronically coded form includes pins with a coded setup.

8. The computer system of claim 1 wherein said clock generating section includes a programmable frequency generator integrated circuit.

9. A method used in a computer system having at least one microprocessor and a main memory coupled to said microprocessor for electronically detecting a maximum rated operating frequency for said microprocessor and selecting an operating frequency for said computer system, the method comprising:

testing each said microprocessor for said maximum rated operating frequency;

stamping a value of said maximum rated operating frequency electronically onto each said microprocessor;

installing each said microprocessor into the computer system;

detecting, electronically, said value of said maximum rated operating frequency for each said microprocessor;

selecting an operating clock frequency for said computer system wherein said operating clock frequency is equal to the maximum rated operating frequency of at least one said microprocessor; and generating said operating clock frequency.

10. The method of claim 9 wherein said stamping step further comprises:

programming said value of said maximum rated operating frequency onto a nonvolatile memory module integrated into each said microprocessor.

11. The method of claim 10 wherein said nonvolatile memory module is an electrically erasable reprogrammable non-volatile memory and said programming step includes writing said value of said maximum rated operating frequency onto a register of said electrically erasable reprogrammable nonvolatile memory.

12. The method of claim 11 wherein said detecting step is performed by a clock generating section coupled to said computer system and having a programmable frequency generator integrated circuit programmed to read said value of said maximum rated operating frequency from said register.

13. The method of claim 9 wherein said stamping step further comprises:

integrating an encoded strapping circuit into said microprocessor which provides said value of said maximum rated operating frequency in an electronically coded form on each microprocessor.

14. The method of claim 13 wherein said an electronically coded form includes pins with a coded setup.

15. The method of claim 13 wherein said detecting step is performed by a clock generating section coupled to said computer system and having a programmable frequency generator integrated circuit programmed to interpret said encoded strapping circuit and read said value of said maximum rated operating frequency.

16. The method of claim 9 wherein, when said computer system has one microprocessor, said operating clock frequency is equal to the maximum rated operating frequency of said microprocessor.

17. The method of claim 16 wherein said detecting, selecting and generating steps are performed by a clock generating section having a programmable frequency generator integrated circuit.

18. The method of claim 9 wherein, when said computer system has more than one microprocessor, said operating clock frequency is equal to the slowest maximum rated operating frequency of said microprocessors, and the method further comprising:

assigning said operating clock frequency to all microprocessors for synchronization of said microprocessors.

19. The method of claim 18 wherein said detecting, selecting, assigning and generating steps are performed by a clock generating section having a programmable frequency generator integrated circuit.

\* \* \* \* \*